United States Patent [19]

Pierce

[11] Patent Number: 4,553,773
[45] Date of Patent: Nov. 19, 1985

[54] LOAD EQUALIZER VALVE AND SUSPENSION SYSTEM

[75] Inventor: William C. Pierce, Muskegon, Mich.

[73] Assignee: Lear Siegler, Inc., Santa Monica, Calif.

[21] Appl. No.: 520,810

[22] Filed: Aug. 5, 1983

[51] Int. Cl.$^4$ .............................................. B60G 5/00
[52] U.S. Cl. .................... 280/676; 137/627.5; 280/81 R; 280/686; 280/712; 280/714; 280/DIG. 1
[58] Field of Search ............ 280/676, 711, 712, 713, 280/714, 686, 81 R, DIG. 1, 104; 137/116.5, 627.5, 628, 630; 251/14, 57

[56] References Cited

U.S. PATENT DOCUMENTS

| | | | |
|---|---|---|---|
| 3,053,335 | 9/1962 | Gnade et al. | 180/24.02 |
| 3,094,341 | 6/1963 | Alfieri | 280/712 |
| 3,140,880 | 7/1964 | Masser | 280/713 |
| 3,199,928 | 8/1965 | Chouings | 280/DIG. 1 |
| 3,231,258 | 1/1966 | Brownyer et al. | 267/31 |
| 3,233,915 | 2/1966 | Hamlet | 280/712 |
| 3,785,673 | 1/1974 | Harbers, Jr. et al. | 280/712 |
| 4,033,608 | 7/1977 | Sweet et al. | 280/711 |
| 4,089,172 | 5/1978 | Junttila | 251/57 |
| 4,099,741 | 7/1978 | Sweet et al. | 280/712 |

Primary Examiner—Joseph F. Peters, Jr.
Assistant Examiner—Kenneth R. Rice
Attorney, Agent, or Firm—Varnum, Riddering, Schmidt & Howlett

[57] ABSTRACT

A tandem axle suspension in which the air pressure in an air spring (28) is controlled by a valve (40) which in turn is responsive to the load at the end of a leaf spring (12) to balance the load on a leaf spring axle (14) with the load on a tag axle (30). A crank mounting (36) connects the end of the leaf springs (12) to the valve (40). The valve (40) has a fixed valve seat (132) and a movable valve seat (116) both of which seat against a movable flat valve element (150). The movable valve seat (116) is biased against the movable flat valve element (150) in part by the load on the leaf spring (12) so that the valve seat (132) and the flat valve element (150) will separate when the load on the leaf spring axle (14) increases. The flat valve element (150) is biased against the fixed valve seat (132) in part by the air pressure int he air spring as the flat valve element (150) closes against the fixed valve seat (132) when the load on the tag axle (30) is at least equal to the load on the leaf spring axle (14). The movable valve seat (116) is biased away from the flat valve element (150) by the air pressure in the air spring so that the movable valve seat (116) separates from the flat valve element (150) when the tag axle load exceeds the leaf spring axle (14) load. An exhaust passageway (114,100,180) is provided to exhaust air from the air spring (28) to reduce an excess load on the tag axle.

22 Claims, 4 Drawing Figures

LOAD EQUALIZER VALVE AND SUSPENSION SYSTEM

FIELD OF THE INVENTION

This invention relates to suspension systems for wheeled vehicles. In one of its aspects, the invention relates to a combination axle suspension wherein the load on the leaf-spring suspension is equalized with a load on an air spring suspension. In another of its aspects, the invention relates to a valve for use in an air spring suspension.

STATE OF THE PRIOR ART

In tandem-axle suspensions, it is know to have a leaf-spring suspension axle in tandem with a pneumatic suspension axle. For example, see U.S. Pat. No. 3,053,335, issued Sept. 11, 1962. In such suspension systems, the load on the vehicle may change. If the pressure in the pneumatic suspension remains the same, more of an increased load will be reflected on the leaf spring axle. Accordingly, it is desirable to change the pressure in the pneumatic suspension in order to equalize the load on the pneumatic suspension axle with the load on the leaf spring axle.

One method of adjusting the pressure in the pneumatic suspension is by measuring the deflection of the leaf spring at a central portion thereof and adjusting the pressure in the air spring responsive to changes in deflection of the leaf spring. Theoretically, the deflection of the leaf spring is responsive to load on the leaf spring axle. One problem with this type of system is that the relationship between the deflection of the leaf spring and load on the axle varies from time to time due to wear, dirt, rust and spring set. Thus, deflections of the spring does not always reflect a true relationship with axle load.

SUMMARY OF THE INVENTION

According to the invention, there is provided a tandem-wheel suspension system of the leaf-spring and pneumatic spring type wherein the load on the leaf spring is directly measured and used to control the amount of pressure in the air-spring suspension. According to the invention, a pressure regulator is mounted in an air line for controlling the air pressure in the air spring for the air-spring suspension. The pressure regulator includes a valve for regulating the flow of pressurized air through the regulator so as to control the pressure in the air spring and actuator means for controlling the operation of the valve so as to regulate the air flow. The actuator is operatively connected between one end of the leaf spring and the valve and is therefore responsive to changes in the load at the end of the leaf-spring suspension. In this manner, the pressure regulator controls the pressure in the air spring so as to distribute the load on the vehicle between the pneumatic and leaf-spring suspensions. Desirably, the actuator element provides the sole supporting connection of one end of the leaf spring and the vehicle.

The pressure regulator further comprises a means to exhaust air from the air spring so as to decrease the load on the pneumatic air suspension when the load on the leaf spring decreases.

In a preferred embodiment, the actuator means comprises a linkage having an upright portion and a lateral portion forming a bell crank element, the upright portion bearing against the end of the leaf spring. Means pivotably mount the linkage to the frame so that upward force on the upright portion is transmitted into lateral force along the lateral portion of the linkage. The bottom portion of the linkage has a rounded end for substantial point or line contact with the leaf spring end. The end portion of the linkage lateral portion likewise has a rounded end for line or point contact.

The actuator means further includes a chamber, a hydraulic fluid disposed in the chamber and orifice means communicating the fluid in the chamber with the valve. The fluid provides an actuating force on the valve. A piston is slidably mounted in the chamber for transmitting the load from the linkage to the hydraulic fluid. The end of the lateral portion of the linkage bears against the piston.

The valve has a valve body with an inlet, an outlet and a passageway communicating the inlet with the outlet. A valve member is positioned in the passageway for restricting flow between the inlet and the outlet. The valve seat is positioned in the passageway and the valve member closes against the valve seat. A first chamber is provided in the activator in communication with the orifice so as to supply hydraulic fluid to the first chamber. The first piston member is slidable in the first chamber, the hydraulic fluid acting against the first piston member, the first piston member being operatively connected with the valve member so that fluid acting on the first piston member controls opening of the valve member to regulate flow from the inlet to the outlet.

Further according to the invention, there is provided a valve for use in controlling the flow of air to an air spring suspension, the valve having a valve body with an inlet, an outlet and a passageway therebetween. A fixed annular valve seat 132 is provided in the passageway between the inlet and outlet and an inner valve seat member having an inner annular valve seat 116 is within and concentric with the fixed annular valve seat. The inner annular valve seat 116 is mounted for reciprocatory axial movement of the valve seat within the valve body from a first position wherein the inner annular valve seat is on one side of the fixed valve seat and to a second position wherein the inner annular valve seat is on the other side of the fixed valve seat. Means bias the inner valve seat member to the second position. A sealing valve member with a sealing surface is shaped to seal against both the fixed and inner annular valve seat. The sealing valve member is reciprocably mounted within the valve body on the other side of the fixed annular valve seat for movement toward and away from the fixed annular valve seat and is biased toward the fixed annular valve seat. Thus, the passageway between the inlet and outlet is closed when the sealing valve member is sealed against the fixed annular valve seat.

An exhaust passageway is provided in the valve body and communicates with the inner valve seat through the inner valve seat member. A seal is provided between the valve body and the inner valve seat member to prevent fluid flow axially therebetween. Thus, the exhaust passageway communicates with the outlet through the inner valve seat member when the inner annular valve seat is separated from the sealing valve member.

Desirably, the biasing means for the sealing valve member includes the fluid pressure in both the valve outlet as well as the valve inlet.

DESCRIPTION OF THE DRAWINGS

The invention will be described with reference to the accompanying drawings wherein like members bear like reference numerals and in which.

BEST MODE FOR CARRYING OUT THE INVENTION

Figure 1:
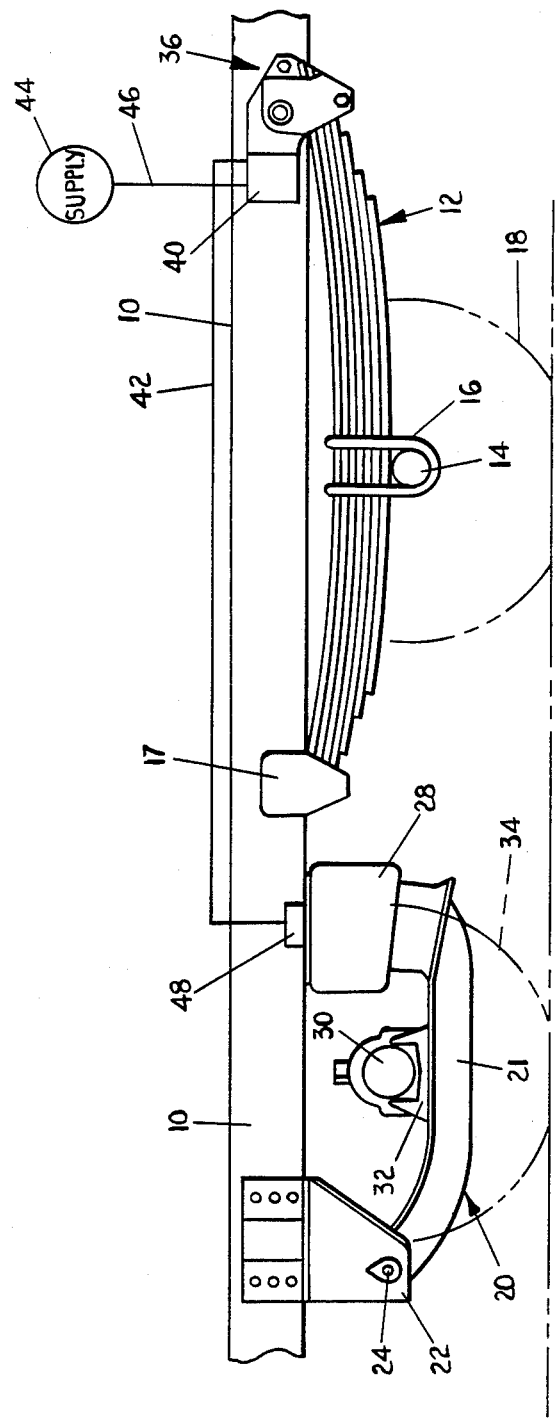
FIG. 1 is a side elevational view of a suspension system including a load equalizer valve in accordance with the invention.

With reference to FIG. 1, there is illustrated a suspension system for vehicles such as tractor trucks and trailers. Generally, such a suspension system is used on each side of the vehicle. For simplicity, only one side of the suspension system is shown.

The suspension system is connected to a frame member 10 of the vehicle and includes a leaf-spring suspension 12 carrying an axle mounting 16 which mounts a driven axle 14. The driven axle 14 mounts a ground-engaging wheel 18 (shown in phantom) in a conventional fashion. In FIG. 1, the front of the vehicle is to the left. The forward end of the leaf spring 12 is secured to the frame member 10 by a conventional mounting 17, such as disclosed, for example, in U.S. Pat. No. 3,929,347, issued Dec. 30, 1975.

Mounted to the frame 10 is a trailing arm suspension 20. The trailing arm suspension 20 includes bracket 22 secured to the frame member 10, a trailing arm 21 which is pivotally mounted to the bracket 22 by pivot pin 24 and an air spring 28 between the frame member 10 and the back end of the trailing arm 21. The trailing arm 21 has mounted thereto an axle mounting 32 which supports an axle 30. The axle 30 mounts a ground-engaging wheel 34 which is shown in phantom. The above-described suspension including a leaf-spring suspension 12 and a trailing arm suspension 20 is well known in the art of suspension systems and further discussion is not believed necessary.

In accordance with the invention, the above-described suspension system includes a load equalizer valve 40 which equalizes the load between the leaf-spring suspension axle 14 and the axle 30. The load equalizer valve 40 is preferably mounted to the frame 10 of the vehicle in a horizontal orientation and is connected by a pressurized air line 46 to an air tank 44 which provides a source of high pressure air for transmission through the load equalizer valve 40 to the air spring 28. A second air line 42 connects the equalizer valve 40 to the air spring 28 which mounts a fitting 48 to which the end of the air line 42 is secured.

As can be seen in FIG. 1, the load equalizer valve 40 is mounted over an end of the leaf spring 12 through a crank mounting 36. As will be described in more detail below, the load equalizer valve 40 directly measures the loading on the leaf spring suspension 12 and responsive thereto regulates the air pressure in the air spring 28. The load sensing by the equalizer valve 40 is in distinction to prior known systems wherein a valve responded to a deflection of a leaf-spring suspension in order to regulate air pressure in an air spring.

Figure 2:
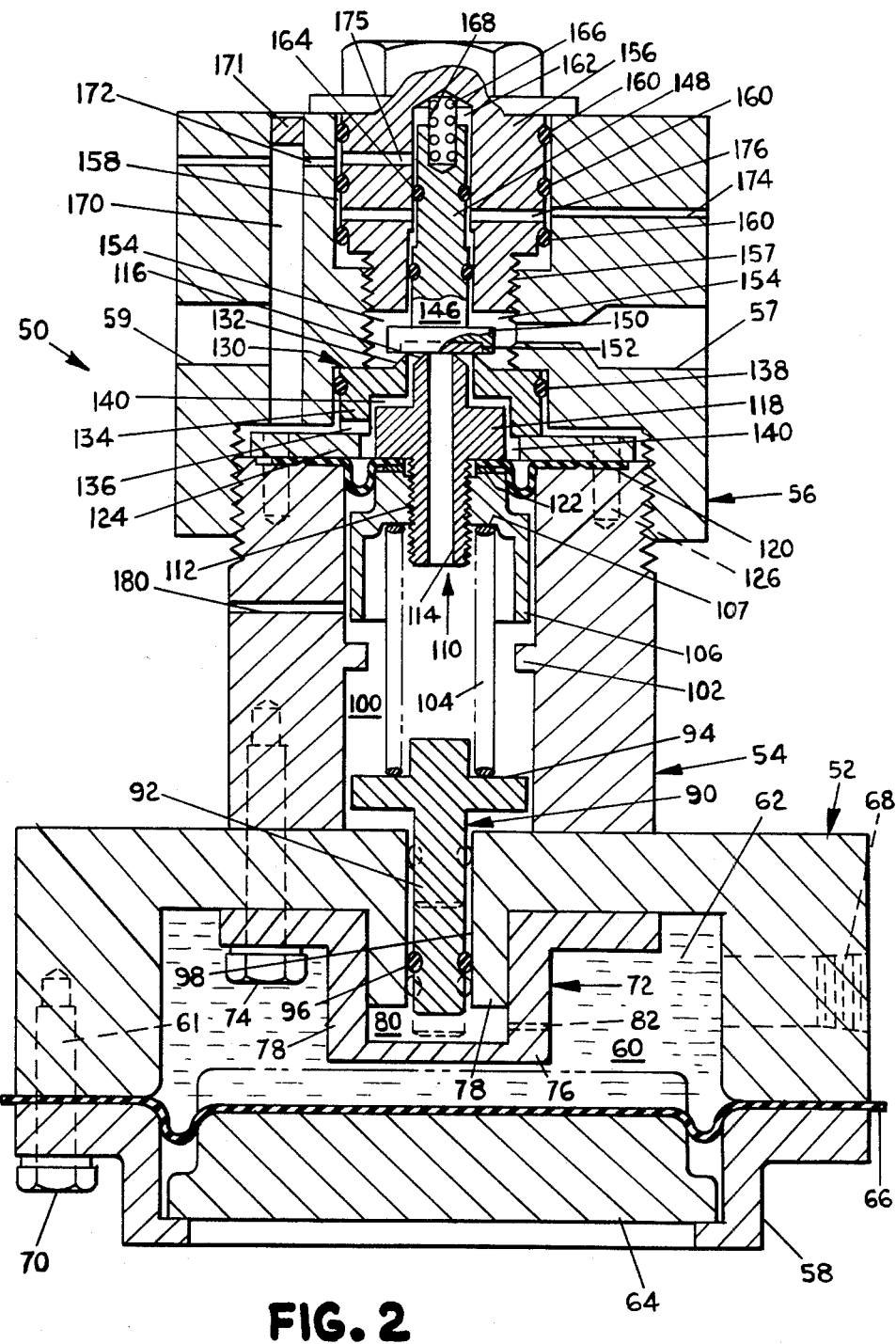
FIG. 2 is a cross-sectional view of the load equalizer valve of FIG. 1.

Referring to FIG. 2, the load equalizer valve 40 has a housing 50 comprising a ring 58, a base 52, a lower housing section 54, and an upper housing 56. The respective housing sections are interconnected as will be described below. The upper housing 56 includes a valve inlet 57 and a valve outlet 59 which are in fluid communication.

The base section 52 forms a chamber 60 in which is disposed a fluid 62 such as silicone. The fluid 62 serves as a means for transmitting a change in the load on the end of the leaf-spring suspension 12 to the valve 40 so as to regulate air pressure to the air spring 28. Slidably mounted within the chamber 60 in the base 52 is a base piston 64 which is a generally flat member. The bottom of the base piston 64 serves as a bearing surface. The base piston 64 is mounted within the chamber 60 against a flexible diaphragm 66. The diaphragm 66 is held in place on the base section 52 by capturing the annular edge portion thereof between ring 58 and the base 52 of the housing 50. The ring 58 and the base 52 are held together by means of bolts 70 which are received in corresponding theaded bores 61 of the base sections 52. The bolts 70 also pass through the edge portion of the diaphragm 66 so as to assist in retaining the diaphragm 66 in place.

Mounted within the chamber 60 is a bonnet 72. The bonnet 72 is bolted to the lower housing 54 by bolts 74. The bonnet 72 forms a depending cup 76 which is disposed within the chamber 60. The cup 76 receives a generally annular flange 78 which depends from the base 52. The space between the bonnet 72 and the flange 78 forms a chamber 80 which communicates with chamber 60 by means of an orifice 82. Orifice 82 is relatively small and functions to dampen impact loads and to smooth out operation of the pneumatic system.

Disposed within the chamber 80 is the end of a push rod 92 which forms part of an intermediate piston 90. The intermediate piston 90 includes a shoulder 94 which is slidable within a chamber 100 formed by the lower housing 54. The push rod 92 which extends from the shoulder 94 is slidable within a corresponding bore 98 formed by the flange 78 of the base section 52. An O-ring 96 is mounted to the push rod 92 so as to provide for sealing between the chamber 80 and the chamber 100. Alternatively, a diaphram can be used between the push rod 92 and the annular flange 78 to seal the chamber 80 from chamber 100. It can be seen that the lower end of the push rod 92 is acted upon by fluid in chamber 80. Chamber 100 includes a stop 102 in the form of an annular flange which extends radially inwardly of chamber 100 so as to limit upward displacement of the intermediate piston 90 by engaging the shoulder 94.

Disposed within chamber 100 is a coil spring 104 which is seated between the intermediate piston 90 and a spring cup 106. The spring cup 106 is displaceable within the chamber 100 with displacement being limited by the stop 102 and outer valve seat 130. The spring cup 106 is a generally cylindrical member having an end wall 107 at one end against which an end of the coil spring 104 seats and a depending cylindrical side wall. The opposite end of the coil spring 104 seats against the shoulder 94 on the intermediate piston 90.

The spring cup 106 is threaded onto the lower end of an inner valve seat member 110 by means of a threaded connection 112. The inner valve seat member 110 includes a central orifice 114 and threaded lower portion to receive the spring cup 106. The inner valve seat member 110 carries a valve seat 116 and an enlarged shoulder 118 about the midsection thereof. The inner valve seat member 110 is slidable with the spring cup 106 in the lower housing 54.

Secured between the spring cup 106 and the enlarged shoulder 118 of inner valve seat member 110 is a flexible diaphragm 120. The flexible diaphragm 120 is preferably formed from an elastomeric material such as rubber. The diaphragm 120 is secured in place between a portion of the lower valve housing 54 and a spacer washer 124 which is coaxial with the valve seat 116. The spacer washer 124 is held in place on the lower housing 54 by dowels 126 which extend into corresponding bores in the lower housing 54. A washer 122 is disposed between the inner surface of the diaphragm 120 and the wall of the spring cup 106. The diaphragm 120 is configured so that it has a bulge having a generally U-shaped configuration which extends downwardly between the inner surface of the lower housing 54 and the outer surface of a recessed portion of the end wall 107 of spring cup 106.

Concentrically disposed about the valve seat 116 is an outer valve seat member 130. The outer valve seat member 130 has a generally cup-like configuration with a side wall 134. A passage 136 extends through the side wall 134 of the valve seat member 130. A valve seat, formed by annular, raised flange 132, having a beveled surface extends from the upper portion of the valve seat member 130. An O-ring 138 is mounted to the end wall 134 so as to provide sealing between the outer valve seat member 130 and the upper valve housing 56. It can be seen that the outer valve seat member 130, the inner valve seat member 110 and the spacer washer 124 are configured to form a passageway 140 which allows for fluid flow from the valve inlet 57 through the passageway 140 to passage 136 and eventually to the valve outlet 59.

Mounted within the upper housing 56 is an upper piston 146 having a stem 148 which mounts a flat valve sealing element 150. The valve sealing element 150 has a generally flat lower surface which selectively abuts the valve seat 116 of the inner valve seat member 110 and the raised flange 132 of the outer seat 130. The valve sealing element 150 includes an elastomeric insert 152 which insures seating of the valve seat 116 and flange 132 against the valve sealing element 150. The sealing element 150 is disposed within a chamber 154 within the upper valve housing 56. The lower housing 54 is attached to the upper housing 56 by threads.

Mounted within the upper valve housing 56 is a metallic insert 156 which is received in a bore 158 of the housing 56. The insert is sealed to the upper housing 56 by a plurality of O-rings 160. The insert 156 is in the form of a bolt having external threads 157 which mate with an internal thread in a lower bore of upper valve housing 56. The insert 156 includes a central bore 162 which forms a chamber in which is slidable the stem 148 of the upper piston 146. O-rings 164 seal the stem 148 within the bore 162. A coil spring 166 is mounted in a bore 168 in the end of the stem 148 of the upper piston 146 and bears against an upper surface of the bore 162 so as to provide a biasing force on the upper piston 146.

The upper housing 56 further includes a passage 170 which communicates with the passage 136 in outer valve seat 130 and with the valve outlet 59. Passage 170 is closed by a plug 171. Accordingly, it can be seen that fluid flow from the inlet 57 to the outlet 59 is provided through chamber 154, passage 140, passage 136 and passage 170.

The passage 170 extends past the valve outlet 59 and connects with a bleed line 172 which in turn communicates through passage 175 with the bore 162 in which the end of valve stem 148 of the upper piston 146 is disposed. Thus, a biasing force is provided by the coil spring 166 as well as the fluid pressure acting on the upper end of stem 148 so as to bias the upper piston 146 against the valve seat member 110 and the outer valve seat 130. The insert 156 includes bleed line 176 which allows for the exhaust to the atmosphere of fluid which bleeds past the O-rings 164. In this regard, the bleed line 176 communicate with a bleed line 174 which extends through the upper housing 56.

The lower housing 54 includes an exhaust bleed 180 which communicates with chamber 100 and with outlet 59 through orifice 114 in inner valve seat member 110, valve seat 116, passageway 140 and passage 136.

In operation of the valve shown in FIG. 2, the valve is shown under ordinary conditions wherein the load on the leaf-spring axle 14 would be approximately equal to the load on the axle 30. Thus, in this condition, the valve is said to be in an equilibrium position. This position is achieved by balancing the force against the base piston 64, as transmitted through the fluid 62, intermediate piston 90, coil spring 104 and inner valve seat member 110 against the force generated by the pressure of fluid in passageway 140 against the shoulder 118 and the exposed annular area of diaphragm 120, the pressure of fluid in chamber 154 against the upper and lower portions of valve sealing element 150, the force on the stem 148 by the pressure in the upper portion of the bore 162 and the coil spring 166. When the load on the vehicle increases and the load therefore increases on the spring axle 14, an increased force will be transmitted to the base piston 64 which will cause an imbalance in the forces within the valve. The increased pressure on the base piston 64 will force the intermediate piston 90 upwardly against the tension in coil spring 104 and in so doing will force the inner valve seat member 110 upwardly and thereby force the valve seat 150 upwardly. At this time, the valve seat 116 and the valve sealing element 150 will remain in contact but the valve sealing element 150 will separate from the raised flange 132. Thus, communication will be established between the air inlet 57 and the air outlet 59 through chamber 154, passageway 140, passage 136 and passage 170. As the fluid passes from the inlet 57 to the outlet 59, the pressure in the air spring 28 will increase, thereby increasing the pressure at the outlet 59. This increase in pressure will be reflected as a downward force on the stem 148 to tend to close the valve sealing element 150 against the raised flange 132. This increased pressure will also be reflected as a downward force on the exposed annular area of diaphragm 120 and shoulder 118. When the downward forces on the valve sealing element 150, diaphragm 120, and shoulder 118 become equal to the upward force from spring 104, the valve sealing element 150 will close against the raised flange 132. The spring rate of the springs 104 and 166 and the various relative sizes of the pressurized surfaces within the valve are selected so that the pressure in the air spring 28 is sufficient to balance the load on axle 30 with the load on the spring axle 14 when the valves are in the closed position as illustrated in FIG. 1.

On the other hand, if the load on the vehicle decreases and a lesser load is provided on the spring axle 14, that decreased load will be reflected in less force against the base piston 64. The decrease in force against the base piston 64 will be reflected in lower pressure on the fluid 62, thereby creating an imbalance in forces within the valve. However, the imbalance in forces is reflected between the valve sealing element 150 and the inner valve seat member 110, which results in downward movement of the inner valve seat member 110 along with downward movement of the spring cup 106, the coil spring 104 and the intermediate piston 90. The valve sealing element 150, however, remains in place against the raised flange 132. Therefore, the valve seat 116 will separate from the valve sealing element 150, thereby providing a passage between the air outlet 59 and the exhaust passage 180 through the lower portion of passage 170, passage 136, passageway 140 and orifice 114. The pressure in the air spring 28 will thus bleed to the atmosphere through the exhaust passage 180 until such time as the load on the axle 30 equals the load on the leaf-spring axle 14.

Figure 3:
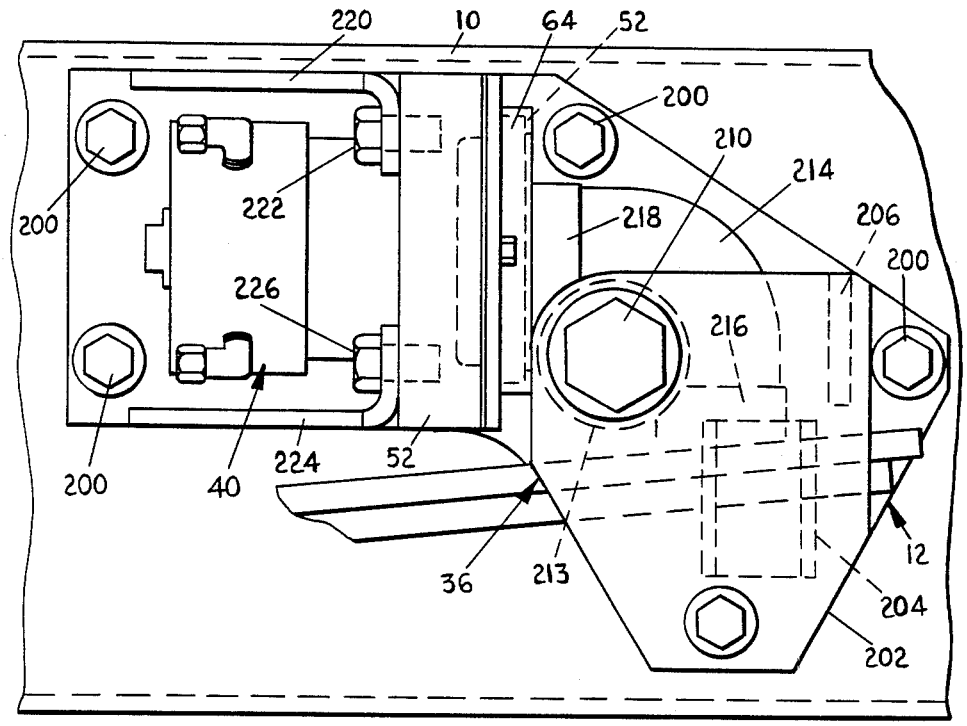
FIG. 3 is an enlarged elevational view of a portion of the suspension system shown in FIG. 1, illustrating the coupling between the leaf spring and the valve.
Figure 4:
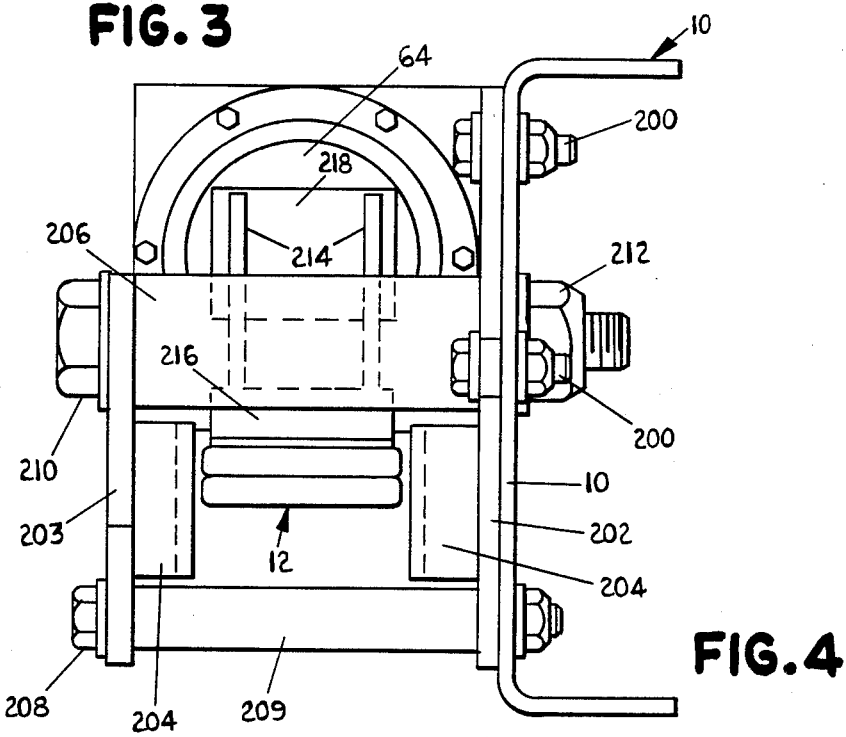
FIG. 4 is an end elevational view of the suspension portion shown in FIG. 3.

Referring now to FIGS. 3 and 4, the connection between the end of the leaf spring 12 and the equalizer valve 40 is shown. The crank mounting 36 comprises a hanger bracket 202 which is mounted to the frame 10 through bolts 200 and a mounting plate 203 which is spaced from the hanger bracket 202 by a spacer plate 206 and a bushing 209. A bolt 208 extends through the bushing 209 to secure the bottom portion of the mounting plate 203 to the hanger bracket 202. The plate 206 can also be welded to the mounting plate 203 and to the hanger bracket 202. A larger bolt 210 extends through the mounting plate 203 and through the hanger bracket 202 and through the frame 10 and is secured by a nut 212. A bushing 213 is mounted around the bolt 210 between the mounting plate 203 and the hanger bracket 202 to space the hanger bracket 202 from the mounting plate 203. The nut 212 is tightened only sufficiently to retain the bolt 210 in position but does not draw the bushing 213 tightly against the mounting bracket 203 and the hanger bracket 202. Thus, the bushing 213 is freely rotatable on the bolt 210.

A pair of bell-crank linkages 214 are secured by welding to the bushing 213 so that the bell-crank linkages 214 can be rotated therewith. Alternatively, the linkages 214 and the bushing 213 could be cast as one piece. A rounded head 216 is provided at the lower end of the bell-crank linkages 214 and abuts the upper portion of the leaf spring 12. A similar rounded head 218 is provided on the lateral end of the bell-crank linkages 214 for abutment with the base piston 64 of the valve 40. The bottom portions of the heads 216 and 218 are rounded so as to make point or line contact with the leaf spring 12 and the base piston 64, respectively.

Thus, a change in load at the end of the leaf spring 12 is transmitted directly to the base piston 64 of the equalizer valve 40. The invention thus provides a means for measuring the load on the leaf spring axle directly and for controlling the pressure in the air spring accordingly, thereby balancing the load on the leaf spring axle with the load on the air spring axle.

Whereas the invention has been described with reference to a control valve for each suspension, it is within the scope of the invention to provide a single control valve, operated from one leaf-spring suspension, to control the pressure in a pneumatic suspension on each side of the vehicle. Further, the control valve can be mounted vertically with a direct connection to the leaf spring and in accordance with the invention and need not be mounted horizontally and coupled to the spring end with a bell crank as illustrated in the drawing and described herein.

Reasonable variation and modification are possible within the scope of the foregoing disclosure and drawings without departing from the spirit of the invention which is defined by the appended claims.

The embodiments of the invention in which an exclusive property or privilege is claimed are defined as follows:

1. A suspension for wheeled vehicles comprising:
   a leaf spring suspension mounted at opposing ends to a vehicle frame;
   a first axle secured to said leaf spring suspension and mounting ground-engaging wheels;
   a pneumatic suspension secured to said vehicle frame;
   a second axle secured to said pneumatic suspension and mounting ground-engaging wheels;
   said pneumatic suspension including:
   an air spring mounted between said vehicle frame and said second axle;
   a source of pressurized air for supplying air to said air spring;
   an air line communicating said source of pressurized air with said air spring;
   pressure regulator means mounted in said air line for controlling the air pressure in said air spring;
   said pressure regulator means including:
   valve means for regulating the flow of pressurized air through said regulator means so as to control the pressure in said air spring; and
   actuator means having a bearing member for controlling operation of said valve means responsive to the force applied to said bearing member so as to regulate said air flow, said bearing member at least in part operatively supporting an end of said leaf-spring suspension so that said actuator means directly measures the load at the end of said leaf-spring suspension;
   wherein said pressure regulator means controls the pressure in said air spring so as to distribute the load on said vehicle between said first and second axles.

2. A suspension for wheeled vehicles according to claim 1 wherein the sole supporting connection of said one end of said leaf spring to said vehicle frame is through said bearing member.

3. The suspension system of claim 2 wherein said pressure regulator means further comprises means to exhaust air from said air spring so as to decrease the load on said pneumatic air suspension when the load of said leaf spring decreases.

4. The suspension system of claim 3 wherein said actuator means comprises a bell crank linkage having an upright portion and a laterally-extending portion, the upright portion bearing against said end of said leaf spring and means pivotably mounting said linkage to said frame so that upward force on said linkage upright portion is transferred into lateral force along said lateral portion.

5. The suspension of claim 4 wherein the bottom portion of said linkage upright portion has a rounded end for substantial point or line contact with said leaf spring end.

6. The suspension of claim 5 wherein the end portion of said linkage lateral portion has a rounded end for a substantially point or line contact.

7. The suspension of claim 4 wherein the end portion of said linkage lateral portion has a rounded end for substantial point or line contact.

8. The suspension of claim 6 wherein said actuator means further comprises:
a first chamber;
a hydraulic fluid disposed in said first chamber;
orifice means communicating said fluid in said chamber with said valve means, said fluid providing an actuating force on said valve means; and
first piston means slidable in said chamber for transmitting the load at said fixed end of said leaf spring suspension to said hydraulic fluid;
said bell crank lateral portion bearing against said first piston means.

9. The suspension system of claim 8 wherein said valve means further comprises:
a valve body having an inlet, an outlet and a passageway communicating said inlet with said outlet;
a valve member in said passageway for regulating flow between said inlet and said outlet;
a valve seat against which said valve member closes;
a second chamber in communication with said orifice means so as to supply said hydraulic fluid to said second chamber;
a second piston member slidable in said second chamber, said hydraulic fluid acting against said second piston member;
said second piston member being operatively connected with said valve member so that fluid acting on said second piston member controls opening of said valve member to regulate flow from said inlet to said outlet.

10. The suspension system of claim 9 wherein said valve member further comprises:
a third piston member slidable in said valve body;
said third piston member including a valve surface for closing against said valve seat.

11. The suspension system of claim 4 wherein said actuator means further comprises:
a first chamber;
a hydraulic fluid disposed in said first chamber;
orifice means communicating said fluid in said chamber with said valve means, said fluid providing an actuating force on said valve means; and
first piston means slidable in said first chamber for transmitting the load at said fixed end of said leaf spring suspension to said hydraulic fluid;
said bell crank linkage lateral portion bearing against said first piston means.

12. The suspension system of claim 11 wherein said valve means further comprises:
a valve body having an inlet, an outlet and a passageway communicating said inlet with said outlet;
a valve member in said passageway for regulating flow between said inlet and said outlet;
a valve seat against which said valve member closes; and wherein said actuator means comprises a second chamber in communication with said orifice means so as to supply said hydraulic fluid to said second chamber;
a second piston member slidable in said second chamber, said hydraulic fluid acting against said second piston member;
said second piston member being operatively connected with said valve member so that fluid acting on said second piston member controls opening of said valve member to regulate flow from said inlet to said outlet.

13. The suspension system of claim 12 wherein said valve member further comprises:
a third piston member slidable in said valve body;
said third piston member including a valve surface for closing against said valve seat.

14. The suspension system of claim 1 wherein said actuator means further comprises:
a first chamber;
a hydraulic fluid disposed in said first chamber;
orifice means communicating said fluid in said chamber with said valve means, said fluid providing an actuating force on said valve means; and
first piston means forming said bearing member and slidable in said first chamber for transmitting the load at said fixed end of said leaf spring suspension to said hydraulic fluid;
said first piston means being operatively connected with said fixed end of said leaf-spring suspension whereby changes in the load at said one end of said leaf spring are transmitted by said first piston means to said valve means by said hydraulic fluid.

15. The suspension of claim 14 wherein said valve means further comprises:
a valve body having an inlet, an outlet and a passageway communicating said inlet with said outlet;
a valve member in said passageway for regulating flow between said inlet and said outlet;
a valve seat against which said valve member closes; and wherein said actuator means further comprises a second chamber in communication with said orifice means so as to supply said hydraulic fluid to said second chamber;
a second piston member slidable in said second chamber, said hydraulic fluid acting against said second piston member;
said second first piston member being operatively connected with said valve member so that fluid acting on said second piston member controls opening of said valve member to regulate flow from said inlet to said outlet.

16. The suspension of claim 15 wherein said valve member further comprises:
a third piston member slidable in said valve body; said third piston member including a valve surface for closing against said valve seat.

17. The suspension of claim 1 wherein said valve means comprises:
a valve body having an inlet, an outlet and a passageway therebetween and an exhaust passageway;
a fixed annular valve seat in the passageway between the outlet and inlet;
an inner valve seat member having an inner annular valve seat within and concentric with the fixed annular valve seat;
means mounting the inner valve seat member for reciprocatory axial movement of said inner valve seat within said valve body from a first position wherein said inner annular valve seat is on one side of said fixed valve seat and to a second position wherein said inner annular valve seat is on another side of said fixed annular valve seat;
means, including said actuator means, biasing said inner valve seat member to said second position;
a sealing valve member with a sealing surface shaped to seal against both said fixed and inner annular valve seats;
means mounting said sealing valve member in said valve body on the other side of said fixed annular valve seat for reciprocatory movement toward and away from said fixed annular valve seat within said valve body;

means biasing said sealing valve member in sealing engagement with said fixed annular seat, whereby said passageway between said inlet and said outlet is closed when said sealing valve member is sealed against said fixed annular valve member;

said exhaust passageway communicating with said inner valve seat through said inner valve seat member;

means sealing said valve body to said inner valve seat member to prevent fluid flow axially therebetween;

whereby said exhaust passageway connects with said outlet through said inner valve seat member when said inner annular valve seat is separated from said sealing valve member.

18. The suspension according to claim 17 wherein said sealing valve member biasing means includes the fluid pressure in said valve outlet.

19. The suspension of claim 18 wherein said sealing valve member biasing means includes the fluid pressure in said valve inlet.

20. A valve for use in controlling the flow of air to an air spring in a suspension system, said valve comprising:
a valve body having an inlet, an outlet and a passageway therebetween and an exhaust passageway;
a fixed annular valve seat in said passageway between said inlet and outlet;
an inner valve seat member having an inner annular valve seat within and concentric with said fixed annular valve seat;
means mounting the inner valve seat member for reciprocatory axial movement of said inner valve seat within said valve body from a first position wherein said inner annular valve seat is on one side of said fixed valve seat to a second position wherein said inner annular valve seat is on another side of said fixed annular valve seat;
means for biasing said inner valve seat member to said second position;
a sealing valve member with a sealing surface shaped to seal against both said fixed and inner annular valve seat;
means mounting said sealing valve member in said valve body on the other side of said fixed annular valve seat for reciprocatory movement toward and away from said fixed annular valve seat;
means biasing said sealing valve member in sealing engagement with said fixed annular valve seat, whereby said passageway between said inlet and outlet is closed when said sealing valve member is sealed against said fixed annular valve member;
said exhaust passageway communicating with said inner valve seat through said inner valve seat member;
means sealing said valve body and said inner valve seat member to prevent fluid flow axially therebetween;
whereby said exhaust passageway communicates with said outlet through said inner valve seat member when said inner annular valve seat is separated from said sealing valve member.

21. The valve of claim 20 wherein said sealing valve member biasing means includes the fluid pressure in said valve outlet.

22. The valve of claim 21 wherein the sealing valve member biasing means includes the fluid pressure in said valve inlet.

* * * * *